US010628198B2

(12) United States Patent
Tsirkin et al.

(10) Patent No.: US 10,628,198 B2
(45) Date of Patent: Apr. 21, 2020

(54) HYPERVISOR MANAGEMENT OF MIGRATION NOTIFICATION AND RESPONSE MESSAGES FOR VIRTUAL MACHINES

(71) Applicant: Red Hat Israel, LTD, Raanana (IL)

(72) Inventors: Michael Tsirkin, Westford, MA (US); Amnon Ilan, Katzir (IL)

(73) Assignee: Red Hat Israel Ltd., Raanana (IL)

(*) Notice: Subject to any disclaimer, the term of this patent is extended or adjusted under 35 U.S.C. 154(b) by 54 days.

(21) Appl. No.: 15/691,522

(22) Filed: Aug. 30, 2017

(65) Prior Publication Data
US 2019/0065230 A1  Feb. 28, 2019

(51) Int. Cl.
G06F 9/455 (2018.01)
H04L 29/12 (2006.01)
G06F 9/48 (2006.01)
G06F 9/50 (2006.01)

(52) U.S. Cl.
CPC ...... G06F 9/45558 (2013.01); G06F 9/45533 (2013.01); G06F 9/45554 (2013.01); G06F 9/4856 (2013.01); G06F 9/5083 (2013.01); H04L 61/2007 (2013.01); H04L 61/2076 (2013.01); H04L 61/2084 (2013.01); G06F 2009/4557 (2013.01); G06F 2009/45595 (2013.01)

(58) Field of Classification Search
CPC ........... G06F 2009/4557; G06F 9/5083; G06F 9/4856
USPC ...................................................... 718/1, 105
See application file for complete search history.

(56) References Cited

U.S. PATENT DOCUMENTS

| 7,013,482 | B1 | 3/2006 | Krumel |
| 7,492,787 | B2 | 2/2009 | Ji et al. |
| 7,761,573 | B2 | 7/2010 | Travostino et al. |
| 8,396,986 | B2 | 3/2013 | Kanada et al. |
| 8,413,147 | B2 * | 4/2013 | Shen .................. G06F 9/45558 718/1 |

(Continued)

FOREIGN PATENT DOCUMENTS

| CN | 103299278 A | 9/2013 |
| CN | 105208048 A1 | 12/2015 |

(Continued)

OTHER PUBLICATIONS

Silvera et al., "IP Mobility to Support Live Migration of Virtual Machines Across Subnets" (Year: 2009).*

(Continued)

Primary Examiner — Phillip H Nguyen
(74) Attorney, Agent, or Firm — Lowenstein Sandler LLP

(57) ABSTRACT

A hypervisor may identify that a virtual machine has been migrated to the hypervisor from another hypervisor. In response to identifying that the virtual machine has been migrated, the hypervisor may provide a notification message including one or more network addresses associated with the migrated virtual machine. The hypervisor may receive network traffic data and determine that the received network traffic data corresponds to a response message for at least one of the one or more network addresses associated with the migrated virtual machine. The hypervisor may determine that each of the one or more network addresses has not received the response message and provide a subsequent notification message.

20 Claims, 6 Drawing Sheets

(56) References Cited

U.S. PATENT DOCUMENTS

| | | | |
|---|---|---|---|
| 8,429,647 B2* | 4/2013 | Zhou | G06F 9/4856 709/220 |
| 8,539,045 B2 | 9/2013 | Kang et al. | |
| 8,819,678 B2 | 8/2014 | Tsirkin | |
| 8,850,430 B2 | 9/2014 | Hayward et al. | |
| 8,924,560 B2 | 12/2014 | Pang et al. | |
| 8,966,495 B2* | 2/2015 | Kulkarni | G06F 9/45558 718/105 |
| 9,008,084 B2 | 4/2015 | Zhang et al. | |
| 9,081,603 B2* | 7/2015 | Zhang | H04L 49/70 |
| 9,104,460 B2 | 8/2015 | Jansen | |
| 9,160,668 B2 | 10/2015 | Tripathi et al. | |
| 9,229,755 B2 | 1/2016 | Dow et al. | |
| 9,336,042 B1 | 5/2016 | Brenneman et al. | |
| 9,350,614 B2 | 5/2016 | Zeng et al. | |
| 9,396,022 B2 | 7/2016 | Miyazaki | |
| 9,424,144 B2 | 8/2016 | Sridharan et al. | |
| 9,565,126 B2 | 2/2017 | Narayanasamy et al. | |
| 9,628,290 B2 | 4/2017 | Banavalikar et al. | |
| 9,836,327 B1 | 12/2017 | Brouwer et al. | |
| 2008/0222375 A1 | 9/2008 | Kotsovinos et al. | |
| 2009/0183173 A1* | 7/2009 | Becker | G06F 9/45533 719/313 |
| 2011/0134931 A1 | 6/2011 | Merwe et al. | |
| 2013/0232492 A1 | 9/2013 | Wang | |
| 2013/0238802 A1 | 9/2013 | Sarikaya | |
| 2013/0262647 A1 | 10/2013 | Kurita et al. | |
| 2013/0275592 A1 | 10/2013 | Xu et al. | |
| 2013/0305242 A1 | 11/2013 | Wang et al. | |
| 2014/0007089 A1* | 1/2014 | Bosch | G06F 9/4856 718/1 |
| 2014/0025821 A1 | 1/2014 | Baphna et al. | |
| 2014/0289399 A1 | 9/2014 | Shimokuni et al. | |
| 2014/0297889 A1 | 10/2014 | Dong et al. | |
| 2015/0029856 A1 | 1/2015 | Rozenberg | |
| 2015/0117256 A1 | 4/2015 | Sabaa et al. | |
| 2015/0222515 A1 | 8/2015 | Mimura et al. | |
| 2015/0309818 A1 | 10/2015 | Lee et al. | |
| 2015/0370596 A1 | 12/2015 | Fahs et al. | |
| 2015/0378759 A1 | 12/2015 | Pershin et al. | |
| 2016/0004548 A1 | 1/2016 | Suzuki et al. | |
| 2016/0070601 A1 | 3/2016 | Yamamoto et al. | |
| 2016/0077935 A1 | 3/2016 | Zheng et al. | |
| 2016/0103699 A1 | 4/2016 | Thakkar et al. | |
| 2016/0117185 A1* | 4/2016 | Fang | G06F 9/45558 718/1 |
| 2016/0246632 A1 | 8/2016 | Tsirkin | |
| 2016/0323245 A1 | 11/2016 | Shieh et al. | |
| 2016/0378530 A1 | 12/2016 | Ramasubramanian et al. | |
| 2017/0005923 A1 | 1/2017 | Babakian | |
| 2017/0019328 A1 | 1/2017 | Moreno et al. | |
| 2017/0264496 A1 | 9/2017 | Ao et al. | |
| 2017/0359414 A1 | 12/2017 | Sengupta et al. | |
| 2018/0091591 A1 | 3/2018 | Puri et al. | |

FOREIGN PATENT DOCUMENTS

| | | |
|---|---|---|
| EP | 2698957 B1 | 7/2016 |
| WO | 2012051884 A1 | 4/2012 |
| WO | 2012119390 A1 | 9/2012 |
| WO | 2017210641 A1 | 12/2017 |

OTHER PUBLICATIONS

Kalim et al., "Seamless Migration of Virtual Machines Across Networks" (Year: 2013).*

Bifulco et al., "Transparent migration of virtual infrastructures in large datacenters for Cloud Computing" (Year: 2011).*

Nobel, Rickard, The vSwitch "Notify Switches" setting, Rickard Nobel VMware, Windows, Storage and Networking, Jul. 14, 2012, downloaded from: http://rickardnobel.se/vswitch-notify-switches-setting/.

Gigamon, Network Monitoring for Virtual Server Environments, Solution Brief, 2014, downloaded from: https://www.gigamon.com/sites/default/files/resources/solutions/sb-network-monitoring-for-virtual-server-environments-3115.pdf.

Vaes, Karim, Azure : How to Prepare for Maintenance Impacting your Virtual Machines, The insights of a Quirky Cloud Solution Architect on his journey through the fast paced IT landscape., Jan. 13, 2017, downloaded from: https://kvaes.wordpress.com/2017/02/13/azure-how-to-prepare-for-maintenance-impacting-your-virtual-machines/.

Nachum, Youval, et al. "Scaling the Address Resoultion Protocol for Large Data Center (SARP)", http://tools.ietf.org/id/draft-nachum-sarp-04.txt, Feb. 24, 2013, 15 pages.

Microsoft Corporation, "Simplify Virtual Machine Management and Migration with Ethernet Fabrics in the Datacenter", http://www.brocade.com/content/dam/common/documents/content-types/whitepaper/brocade-ms-ethernet-fabric-solution-blueprint.pdf, Mar. 2011, 20 pages.

Li et al., "HyperMIP: Hypervisor Controlled Mobile IP for Virtual Machine Live Migration Across Networks", School of Computer Science and Engineering, Beihang University, Beijing, China, accessed, Jun. 28, 2017, 9 pages, https://pdfs.semanticscholar.gor/661e/4e7dcde6197740184466a16daf7397238184.pdf.

"A Virtual Machine Loses Network Connectivity after vMotion (1007464)", VMWare Knowledge Base, Nov. 29, 2016, 2 pages, https://kb.vmware.com/selfservice/microsites/search.do?language=en_US&cmd=displayKC&externalId=1007464.

Wang et al., "Virtual Routers on the Move: Live Router Migration as a Network-Management Primitive", Princeton University, Princeton, NJ, USA; AT&T Labs—Research, Florham Park, NJ, USA, Aug. 17-22, 2008, 12 pages, http://www.cs.princeton.edu/courses/archive/fall10/cos561/papers/VROOM08.pdf.

Cully et al., "Remus: High Availability via Asynchronous Virtual Machine Replication", Department of Computer Science the University of British Columbia, accessed Jun. 27, 2017, 21 pages, http://www.usenix.org/legacy/event/nsdi08/tech/full_papers/cully/cully_html/.

Stuart, Morgan, "Mitigating Interference during Virtual Machine Live Migration through Storage Offloading", retrived from http://scholarscompass.vcu.edu/cgi/viewcontent.cgi?referer=https://www.google.co.in/&httpsredir=1&article=5724&context=etd, Virginia Commonwealth University, Richmond, Virginia, USA, Dec. 2016, 71 pages.

Shen, Z, et al., "Follow the Sun through the Clouds: Application Migration for Geographically Shifting Workloads", retrived from https://pdfs.semanticscholar.org/e76e/6d0753a4136337f1d10d94257825bd7a1cfd.pdf, Cornell University, In SoCC. ACM, Oct. 5-7, 2016, 14 pages.

Vmware, "More a Virtual Machine to a New Locationor Host", Jul. 28, 2017, 1 page.

* cited by examiner

HYPERVISOR MANAGEMENT OF MIGRATION NOTIFICATION AND RESPONSE MESSAGES FOR VIRTUAL MACHINES

TECHNICAL FIELD

The present disclosure is generally related to virtualization, and is more specifically related to providing a notification message in response to identifying a virtual machine being migrated to a hypervisor.

BACKGROUND

Network virtualization may be software-emulated representations of physical network components of physical network infrastructure used to provide corresponding virtual network components to a host computer system. The host computer system may execute a host operating system (OS) to run an application container. A host computer system may also execute a hypervisor to run one or more virtual machines (VM). The host computer system may be used for network virtualization. The host computer system may include both physical and virtual network components to be used for network virtualization. Physical network components may include networking hardware such as routers, bridges, switches, and network interface cards (NICs) used to facilitate the transmission of data in a computer network. Virtual network components may be software-emulated representations of corresponding physical network components.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
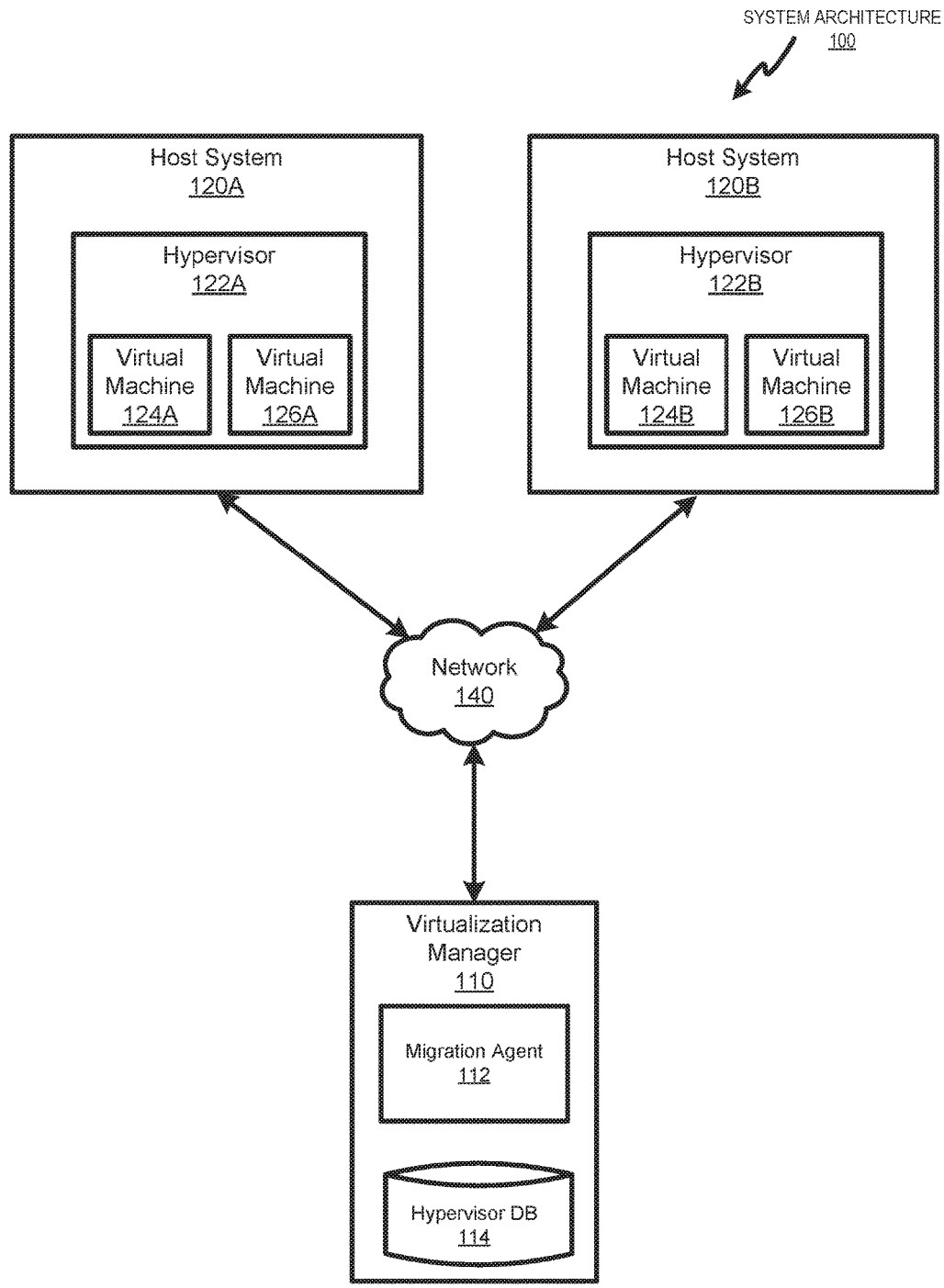
FIG. 1 illustrates an example system architecture in which implementations of the disclosure may operate in accordance with one or more aspects of the present disclosure.

Aspects of the present disclosure relate to transmitting a notification message in response to a virtual machine being migrated. Data centers may include host systems running operating systems (OS) that are communicatively coupled to one or more networks within the data center. The data center may include both physical and virtual network components having corresponding network addresses. Hypervisors executed by the host systems may run virtual machines (VMs). A hypervisor may operate on the one or more networks through one or more of the physical and virtual network components of the host system.

When a VM is migrated from a first hypervisor of the data center to a second hypervisor, the VM may lose the location it operates on at the first hypervisor while keeping the same network addresses. Subsequently, the VM may operate at a new location using the same network addresses on the second hypervisor. For example, while running on the first hypervisor, a VM may operate at location A. Then, when the VM has been migrated to the second hypervisor, the VM may operate at location B. Once the VM has been migrated to the new location (e.g., location B), the second hypervisor may generate and broadcast a notification message on the networks of the data center identifying the new location of the network addresses of the migrated VM. The network message may be received by remote network components of the data center. Examples of remote network components may include, but are not limited to, network switches, routers, servers, bridges, gateways, etc. The network message may facilitate changes to the configuration of the remote network components of the data center in order to allow the migrated VM to operate. For example, in response to receiving a notification message, a network switch may switch from sending data for the network addresses of the migrated VM from location A to location B.

In order to ensure the message is received by all of the remote network components and that the changes to the configuration are completed, the hypervisor may repeatedly broadcast the network message over the networks of the data center at a defined frequency. For example, the hypervisor may broadcast the network message over the networks every 100 milliseconds (ms). However, the hypervisor repeatedly broadcasting the network message over the networks of the data center may consume bandwidth of the networks, decreasing performance of the data center.

Accordingly, described herein are aspects of a hypervisor generating and providing a network message and sending subsequent network messages at a defined frequency until response messages have been received for each of the network addresses of a migrated VM. In an example, the hypervisor may identify that a VM has been migrated from another hypervisor. In response to identifying that the VM has been migrated, the hypervisor may provide a notification message that includes network addresses associated with the migrated VM. The hypervisor may receive network traffic data over a network of the data center and may determine that the received data corresponds to a message for a network address of the migrated VM at its new location. The message received for a network address at the new location may be referred to as a response message. Subsequently, the hypervisor may determine that all of the network addresses for the migrated VM have not received a corresponding response message. The hypervisor may then provide a subsequent notification message at a time interval in view of determining that a response message has not been received for all of the network addresses of the migrated VM.

According to aspects of the disclosure, the hypervisor may provide the notification message for the network addresses of multiple migrated VMs at a first frequency until a response message has been received for all of the network addresses of each migrated VM. Then, the hypervisor may provide subsequent notification messages at a second frequency that is lower than the first frequency for each network address for which a response message has been received for the migrated VM while continuing to provide other responses messages at the first frequency for network addressees for which a response message has not yet been received.

Thus, the aspects of the present disclosure may be advantageous by reducing the number of notification messages being sent over the networks of the data center by the hypervisor, thereby reducing bandwidth consumption and improving performance of the data center. For example, rather than repeatedly providing notification messages over the networks even after the notification message has been received for the one or more network addresses, the hypervisor may provide notification messages at a time interval until response messages have been received for the one or more network addresses. In addition, subsequent notification messages sent at a lower frequency may prevent configuration regressions on existing setup configuration of the data center, further improving performance of the center.

FIG. 1 illustrates an example system architecture 100 in which implementations of the disclosure may operate. The system architecture 100 may include a virtualization manager 110 and multiple host systems 120A and 120B coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

Each of the host systems 120A and 120B may include one or more processors communicatively coupled to memory devices and input/output (I/O) devices. Each of the host systems 120A and 120B may run a virtual machines 124A, 126A and 124B, 126B by executing hypervisors 122A and 122B, respectively, to abstract the physical layer, including processors, memory, and I/O devices, and present this abstraction to the virtual machines 124A, 126A and 124B, 126B as virtual devices. The virtual machines 124A, 126A and 124B, 126B may execute a guest OS that may utilize the underlying virtual devices, including virtual processors, virtual memory, and virtual I/O devices. One or more applications may be running on a virtual machine under the guest operating system. The virtual machines 124A, 126A and 124B, 126B may operate on one or more network addresses. For example, virtual machine 124A may operate on network addresses A and B and virtual machine 124B may operate on networks address C and network address D. In one implementation, the network addresses may correspond to media access control (MAC) addresses, where each of the MAC addresses correspond to a network interface card (NIC) that is used by the virtual machine (e.g., VMs 124A, 126A and 124B, 126B). In another implementation, the network addresses may correspond to virtual local area networks (VLANs) that are partitioned within the data center. The hypervisors 122A and 122B may create, run, manage, and monitor various aspects of the virtual machines 124A, 126A and 124B, 126B operations, including the processing, and storage, memory, and network interfaces. In an illustrative example, hypervisors 122A and 122B may be provided by a Virtual Desktop and Server Management (VDSM) daemon (not shown). The VDSM daemon may include an application programming interface (API) with which the virtualization manager 110 interfaces.

In certain implementations, host systems 120A and 120B may be grouped into one or more logical groups that may be also referred to as a "data center." A data center may represent the highest level of abstraction in a virtualization model. Each data center may be communicatively coupled, via the network 140, to one or more storage domains storing disk images for machines, such as virtual machines 124A, 126A and 124B, 126B.

The virtualization manager 110 may be hosted by a computer system (described in more detail below with reference to FIG. 6) and include one or more computer programs executed by the computer system for centralized management of the system architecture 100. In one implementation, the virtualization manager 110 may include various interfaces, including administrative interface, reporting interface, and/or application programming interface (API) to communicate with host systems 120A and 120B of system architecture 100, as well as to user portals, directory servers, and various other components, which are omitted from FIG. 1 for clarity.

Virtualization manager 110 may include VM migration functionality that migrates an active VM from one hypervisor to another hypervisor. In one example, virtualization manager 110 may include a migration agent 112 and a hypervisor database 114. The migration agent 112 may initiate the migration of a virtual machine (e.g., VMs 124A, 126A and 124B, 126B) and extract certain information, such as identification information (e.g., hypervisor name, hypervisor IP address, etc.), a set of configuration parameters (e.g., software packages, network settings, security settings, power management settings, etc.), and the like, and store the information in the hypervisor database 114 for each existing hypervisor 122A and 122B. Further, migration agent 112 may store received operating states and network address information from the VDSM of the host systems 120A and 120B for the hypervisors 122A and 122B in the hypervisor database 114.

In one implementation, the migration agent 112 may ensure that network components (e.g., remote network components, NICS, etc.) of the data center receive notification messages for each of the network addresses of the migrated VM by detecting that the VM migration has been complete, receiving the notification messages from the hypervisor (e.g., hypervisors 122A and 122B) of the migrated VM and transmitting a copy of the notification message to the network components. For example, the migration agent 112 may receive notification messages for network address A and network address B from hypervisor 122A for VM 124A. The migration agent 112 may transmit a copy of the notification message to the network components indicating the new location of the network addresses of the migrated VM. In another implementation, the migration agent 112 may ensure that the hypervisor of the migrated VM receives a response message for each of the network addresses by receiving a response message for each of the network addresses and transmitting a copy of the response message to the hypervisor of the migrated VM. For example, the migration agent 112 may receive response messages for network address A and network address B and transmit copies of the response messages to hypervisor 122A for VM 124A. In some implementations, the migration agent 112 may monitor activity of a migrated VM and send a message to a migrated VM that is experiencing a period of inactivity to prevent the migrated VM from entering a suspended state. For example, the migration agent 112 may monitor activity of migrated VM 124A and determine migrated VM 124A has been inactive for 10 seconds. In response to determining VM 124A has been inactive, the migration agent 112 may send a message to VM 124A. A VM may be considered to be inactive if the VM has not provided any data over a network for a threshold period of time.

Figure 2:
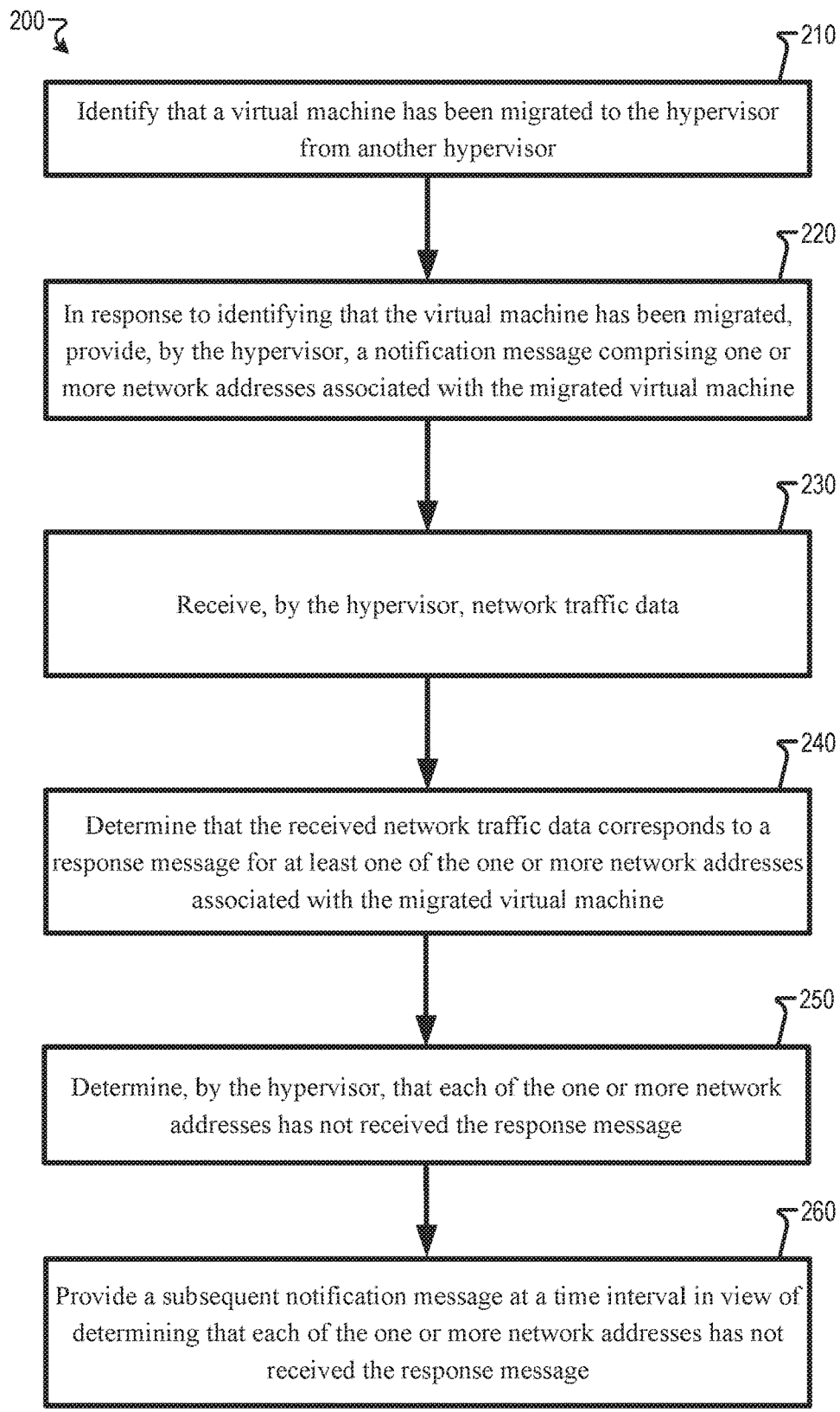
FIG. 2 depicts a flow diagram of an example method to provide a notification message for one of more network addresses in response to migrating a VM from one hypervisor to another hypervisor, according to implementations.

FIG. 2 depicts a flow diagram of an example method 200 to provide a notification message for one of more network addresses in response to migrating a VM from one hypervisor to another hypervisor, according to implementations. The method 200 may be performed by a processing device that may include hardware (e.g., processing logic, circuitry, dedicated logic, programmable logic, microcode, etc.), software (e.g., instructions run or executed on a processing device), or a combination thereof. In general, the method 200 may be performed by hypervisors 122A and/or 122B of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 may begin with a hypervisor executed by a processing device identifying that a virtual machine has been migrated to the hypervisor from another hypervisor (block 210). For example, when the migrated VM was running on a first hypervisor it may operate on network addresses A and B at location A. Then, when the VM is migrated to the second hypervisor, the migrated VM may operate on network addresses A and B at location B.

In response to identifying that the VM has been migrated, the hypervisor may provide a notification message that includes network addresses associated with the migrated VM (block 220). The notification message may be generated by the hypervisor, where the notification message identifies the migrated VM and includes network address information associated with the migrated VM. For example, the notification message may include information that the migrated VM operates on network addresses A and B at location B. In one implementation, the notification message may identify new physical addresses that correspond to the network addresses of the migrated VM. For example, when the VM is migrated from the first hypervisor to the second hypervisor, the VM may lose its old location (e.g., location A) and operate at a new location (e.g., location B).

The hypervisor may provide the notification message for the one or more network addresses associated with the migrated VM. The notification message may be received by various hardware components of the data center, such as NICs, remote networking components, host systems and the like. In response to receiving the notification message, the components of the data center may change the configuration of the data center to send data to the migrated VM at the new location of the network addresses included in the notification message. For example, if a switch receives a notification message from the hypervisor of the migrated VM that includes information indicating that network addresses A and B of the migrated VM are no longer at location A and are now at location B, then the switch may change its configuration and begin routing data for network addresses A and B of the migrated VM to location B. In some implementations, the migration agent 112 may receive the notification message and store the changes to the configuration of the data center in the hypervisor database 114.

The hypervisor may receive network traffic data (block 230). In one implementation, the network traffic data may be received over a network of the data center. The received network traffic data may be addressed for any VM that is operating under the hypervisor. For example, the received traffic data may be data to be operated on by a first VM, such as instructions from a user. Additionally, the received traffic data may be data to be operated on by another VM (e.g., second, third, etc.) that is operating under the hypervisor.

The hypervisor may determine that the received network traffic data corresponds to a response message for the network addresses associated with the migrated VM (block 240). The response message may identify that a remote network component, hardware component, host system or the like, has received the notification message from the hypervisor for one of the network addresses included in the notification message generated at block 220. For example, when a switch receives the notification message from the hypervisor and changes the configuration to route data for network addresses A and B of the migrated VM to location B for the migrated VM, a response message may be sent to location B by the switch. The response message for network addresses A and B of the migrated VM may be received by the hypervisor at location B, confirming that the notification message has been received by the switch. In one implementation, the response message may be transmitted by a host system (e.g., host systems 120A and 120B). In another implementation, the response message may be transmitted by the migration agent 112. The response message may also identify the virtual machine (e.g., specify a name or other such identification of the VM).

Subsequent to determining that the received network traffic data corresponds to a response message, the hypervisor may determine that each of the network addresses of the migrated VM has not received a response message (block 250). In one implementation, the hypervisor may determine that a response message has been received at location B for a first network address, but has not been received for a second network address. For example, the hypervisor may determine that a response message has been received at location B for network address A, but not for network address B.

The hypervisor may then provide a subsequent notification message at a time interval in view of determining that each of the network addresses has not received the response message (block 260). The subsequent notification message may include similar information to the notification message generated at block 220. For example, if the hypervisor has not received a response message for network address B, then the hypervisor may provide a subsequent notification message for network address B. The time interval may correspond to a determined amount of time that is to elapse before a next notification message is to be provided. For example, if the time interval is 100 ms, then the hypervisor may provide a notification message every 100 ms. In one implementation, the time interval may be determined in view of a number of network addresses of the migrated VM. For example, a migrated VM having a large number of network addresses may have a time interval with a greater amount of time between the transmission of notification messages than a migrated VM with a fewer number of network addresses. In some implementations, the time interval may be a variable amount of time, where the time interval increases or decreases over time to provide subsequent notification messages at either a higher or lower frequency. For example, the time interval may initially instruct the hypervisor provide a notification message every 100 ms, but then increase the amount of time between providing notification messages to every 500 ms. Conversely, the time interval may initially instruct the hypervisor provide a notification message every 100 ms, but then decrease the amount of time between providing notification messages to every 50 ms.

In one implementation, the hypervisor may transmit the subsequent notification message for network addresses that have not received a response message identifying the migrated VM. For example, if the hypervisor receives a response message at location B for network address A, but does not receive a response message for network address B, then the hypervisor may provide a subsequent notification message for network address B and may not provide a subsequent notification message for network address A. In another implementation, the hypervisor may provide a first subsequent notification message at a first time interval for network addresses that have received a response message and a second subsequent notification message at a second time interval for network addresses that have not received a response message. For example, if the hypervisor received a response message at location B for network address A, but does not receive a response message for network address B, then the hypervisor may provide a first subsequent notification message for network address A at a time interval of 500 ms and a second subsequent notification message for network address B at a time interval of 100 ms.

Figure 3:
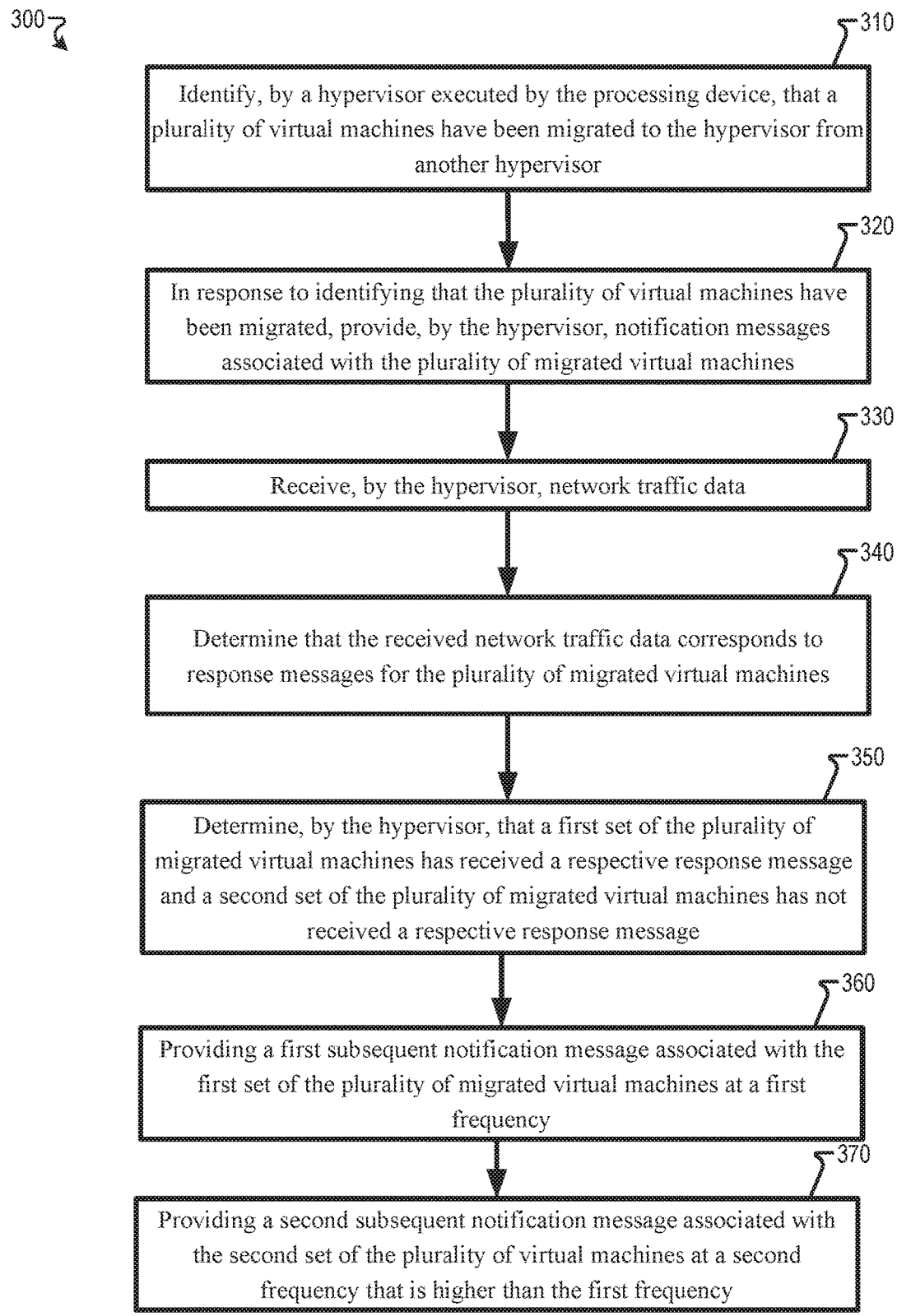
FIG. 3 depicts a flow diagram of an example method to provide a notification message for multiple VMs operating on a hypervisor in response to migrating the multiple VMs from one hypervisor to another hypervisor, according to implementations.

FIG. 3 depicts a flow diagram of an example method 300 to provide a notification message for multiple VMs operating on a hypervisor in response to migrating the multiple VMs from one hypervisor to another hypervisor, according to implementations. The method 300 may be performed by a processing device that may include hardware (e.g., processing logic, circuitry, dedicated logic, programmable logic, microcode, etc.), software (e.g., instructions run or executed on a processing device), or a combination thereof. In general, the method 300 may be performed by hypervisors 122A and/or 122B of FIG. 1.

Method 300 may begin with a hypervisor executed by a processing device identifying that multiple VMs have been migrated to the hypervisor from another hypervisor (block 310). For example, when a first migrated VM was running on a first hypervisor it may operate on network addresses A and B at location A and when a second migrated VM was running on the first hypervisor it may operate on network addresses C and D at location B. Then, when the first VM is migrated to the second hypervisor, the first migrated VM may operate on network addresses A and B at location C. Similarly, when the second VM is migrated to the second hypervisor, the second migrated VM may operate on network addresses C and D at location D.

In response to identifying that multiple VMs have been migrated, the hypervisor may provide notification messages associated with the migrated VMs (block 320). The notification messages may be generated by the hypervisor, where the notification message identifies a particular VM of the migrated VMs and includes network address information associated with the particular VM. For example, a first notification message may include information that the first migrated VM operates on network addresses A and B at location C. Similarly, a second notification message may include information that the second migrated VM operates on network addresses C and D at location D. In one implementation, the notification message may identify new physical addresses that correspond to the network addresses of the migrated VMs. For example, when a VM is migrated from the first hypervisor to the second hypervisor, the VM may lose its old location (e.g., location A) and operate at a new location (e.g., location C).

The hypervisor may provide the notification messages associated with the migrated VMs. The notification messages may be received by various hardware components of the data center, such as NICs, remote networking components, host systems and the like. In response to receiving the notification messages, the components of the data center may change the configuration of the data center to send data to the migrated VMs at the new location of the network addresses included in the notification messages. For example, if a switch receives a notification message from the hypervisor of a migrated VM that includes information indicating that network addresses A and B of the migrated VM are no longer at location A and are now at location C, then the switch may change its configuration and begin routing data for network addresses A and B of the migrated VM to location C. In some implementations, the migration agent 112 may receive the notification message and store the changes to the configuration of the data center in the hypervisor database 114.

The hypervisor may receive network traffic data (block 330). In one implementation, the network traffic data may be received over a network of the data center. The received network traffic data may be addressed for any VM that is operating under the hypervisor.

After the network traffic data has been received by the hypervisor, the hypervisor may determine that the received network traffic data corresponds to response messages for the migrated VMs (block 340). The received network traffic data may correspond to the network traffic data at block 330. The response message may identify that a remote network component, hardware component, host system or the like, has received a notification message from the hypervisor for one of the migrated VMs associated with the notification messages generated at block 320. For example, when a switch receives the notification message from the hypervisor and changes the configuration to route data to the network addresses of one of the migrated VMs at its new location, a response message may be sent to the new location by the switch. The response message may be received at the new location and the hypervisor may determine that the notification message has been received by the switch. In one implementation, the response message may be transmitted by a host system (e.g., host systems 120A and 120B). In another implementation, the response message may be transmitted by the migration agent 112. The response message may also identify the migrated VM (e.g., specify a name or other such identification of the VM).

Subsequent to determining that the received network traffic data includes response messages, the hypervisor may determine that a first set of the migrated VMs has received a respective response message and a second set of the migrated VMs has not received a respective response message (block 350). For example, hypervisor 122A may determine that VM 124A has received a response message while VM 126A has not received a response message.

The hypervisor may then provide a first subsequent notification message associated with the first set of the migrated VMs at a first frequency (block 360). The first subsequent notification message may include similar information to the notification messages generated at block 320. The first frequency may correspond to a determined amount of time that is to elapse before a next notification message is to be provided. For example, if the first frequency is 100 ms, then the hypervisor may provide a notification message every 100 ms. In one implementation, the first frequency may be determined in view of a number of network addresses of the set of migrated VMs. For example, a set of migrated VM having a large number of network addresses may have a frequency with a greater amount of time between providing notification messages than a set of migrated VMs with a smaller number of network addresses. In some implementations, the frequency may be a variable amount of time, where the frequency increases or decreases over time to provide subsequent notification messages at either a higher or lower frequency. For example, the frequency may initially instruct the hypervisor provide a notification message every 100 ms, but then increase the amount of time between providing notification messages to every 500 ms. Conversely, the frequency may initially instruct the hypervisor provide a notification message every 100 ms, but then decrease the amount of time between providing notification messages to every 50 ms.

The hypervisor may also provide a second subsequent notification message associated with the second set of migrated VMs at a second frequency that is higher than the first frequency (block 370). The second subsequent notification message may include similar information to the notification messages generated at block 320. Similar to the first frequency, the second frequency may correspond to a determined amount of time that is to elapse before a next notification message is to be provided. However, the second frequency may have a higher value than the first frequency, which may result in the second subsequent notification message being provided by the hypervisor more frequently than the first subsequent notification message. For example, if the first subsequent notification message has a first frequency of 100 ms, then the second subsequent notification message may have a second frequency of 50 ms. In the present example, the hypervisor may then provide the first subsequent notification message every 100 ms and provide the second subsequent notification message every 50 ms.

Figure 4A:
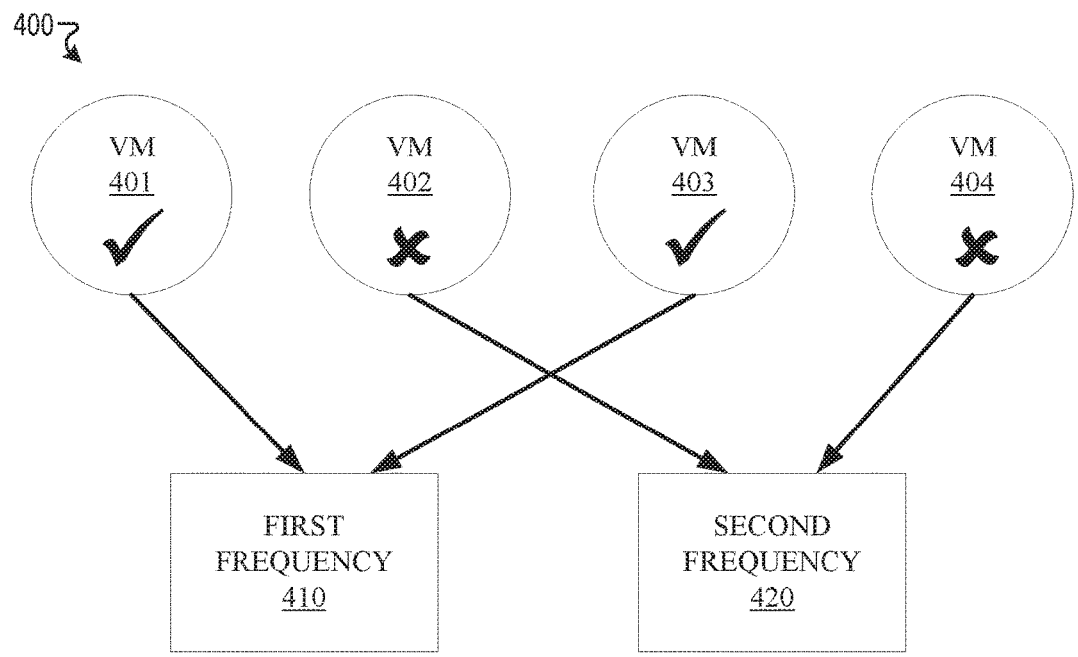
FIG. 4A illustrates migrated VMs operating on a hypervisor that may or may not have received a respective response message, according to implementations.
Figure 4B:
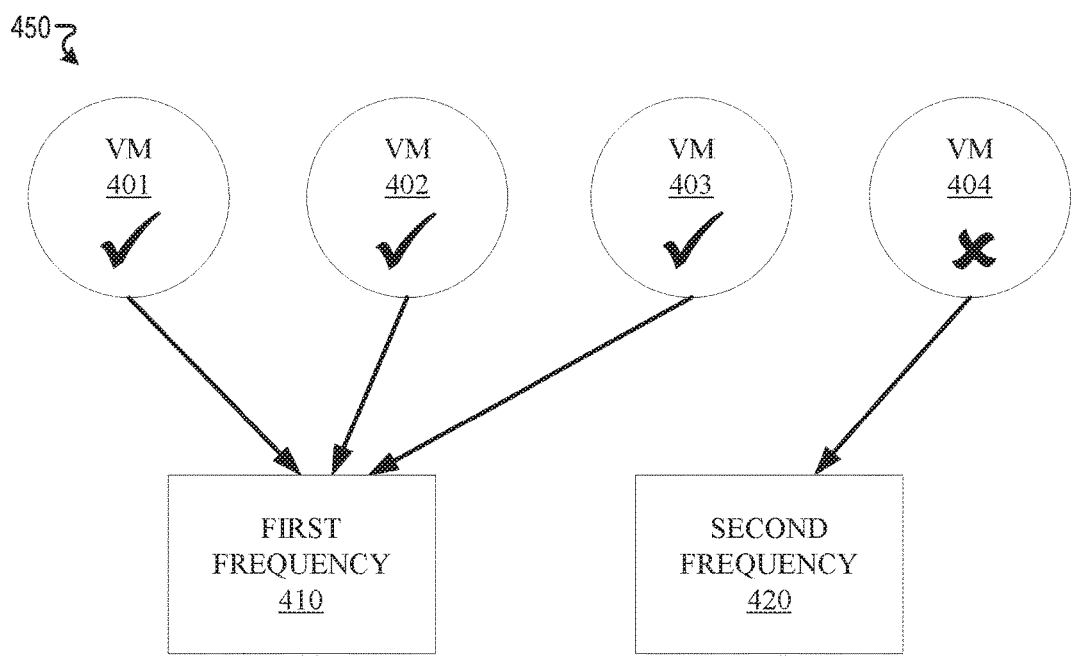
FIG. 4B illustrates migrated VMs operating on a hypervisor after subsequent notification messages have been provided by the hypervisor, according to implementations.

FIGS. 4A and 4B are an illustration 400 of determining whether a response message has been received for each of the migrated VMs, according to implementations. In some implementations, the determination of response messages being received may be performed by the hypervisor that the migrated VMs operate on.

FIG. 4A illustrates migrated VMs operating on a hypervisor that may or may not have received a respective response message, according to implementations. The response messages may correspond to the response messages at block 340 of FIG. 3. Migrated VMs 401-404 may be operating under a hypervisor, such as hypervisors 122A and 122B of FIG. 1. The hypervisor may determine if a respective response message has been received for each of the migrated VMs 401-404, as previously discussed at block 350 of FIG. 3. In the present illustration, migrated VMs 401 and 403 have each received a respective response message. Conversely, migrated VMs 402 and 404 have not received respective response messages. Following the hypervisor determining which migrated VMs 401-404 have received a respective response message, the hypervisor may then provide subsequent notification messages. The hypervisor may provide first subsequent notification messages for VMs 401 and 403 that have received a response message at a first frequency 410. The first frequency 410 may correspond to the first frequency discussed at block 360 of FIG. 3. The hypervisor may also provide second subsequent notification messages for VMs 402 and 404 that have not received a response message at a second frequency 420. The second frequency 420 may correspond to the second frequency discussed at block 370 of FIG. 3.

FIG. 4B illustrates migrated VMs operating on a hypervisor after subsequent notification messages have been provided by the hypervisor, according to implementations. After the subsequent notification messages have been provided at a first frequency 410 and/or second frequency 420, additional response messages may be received for migrated VMs 401-404. The hypervisor may then determine if a respective response message has been received for each of the migrated VMs 401-404, as previously discussed at block 350 of FIG. 3. In the present illustration, migrated VMs 401 and 403 have previously received a respective response message. After transmitting the subsequent notification messages, the hypervisor may receive a response message for VM 402, but may not receive a response message for VM 404. Accordingly, the hypervisor may provide additional subsequent notification messages. The hypervisor may provide additional first subsequent notification messages for VMs 401, 402 and 403 that have received a response message at a first frequency 410. The hypervisor may also provide an additional second subsequent notification message for VM 404 that has not received a response message at a second frequency 420.

Figure 5:
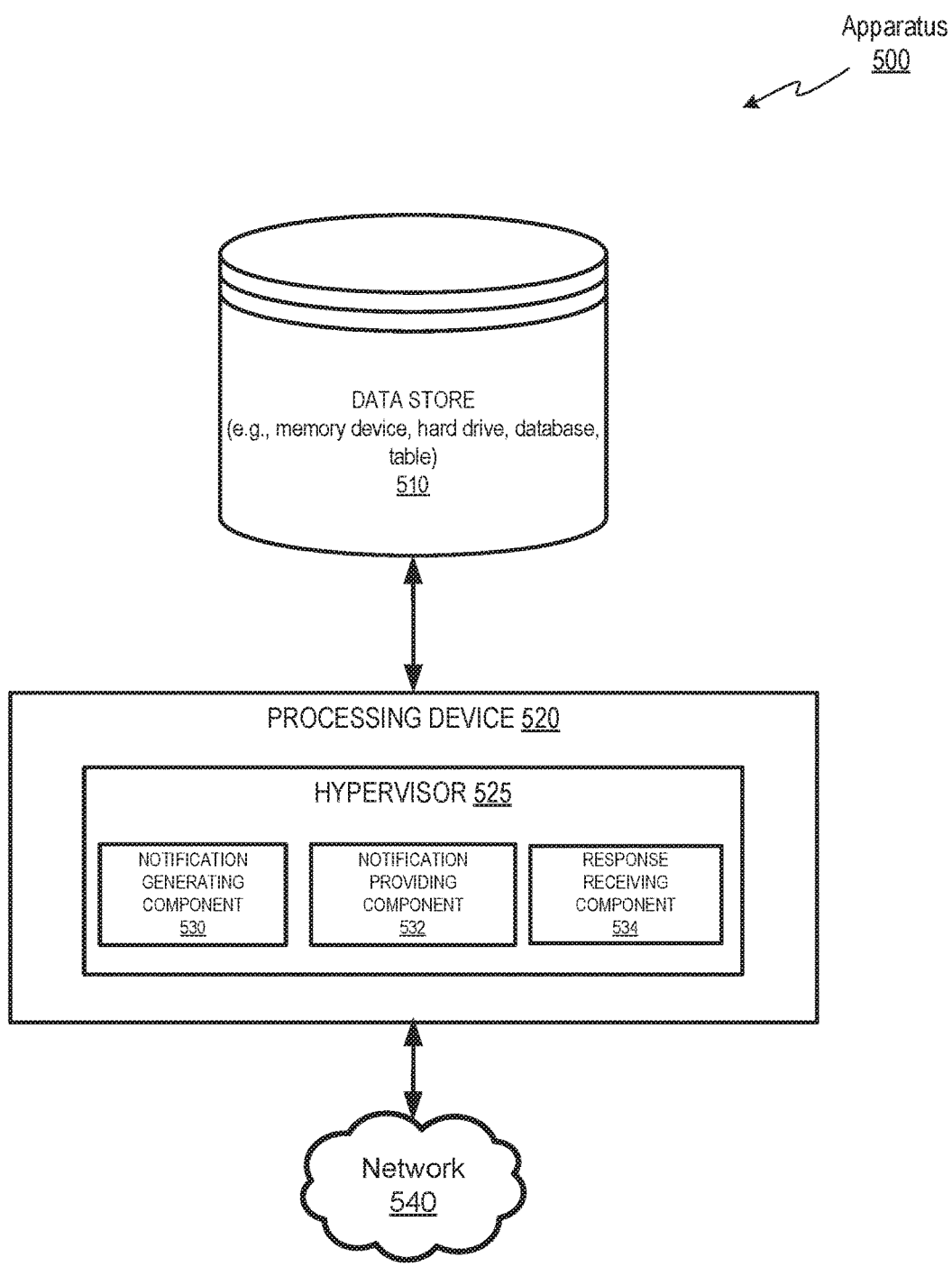
FIG. 5 illustrates an example apparatus in which implementations of the disclosure may operate in accordance with one or more aspects of the present disclosure.

FIG. 5 illustrates an example apparatus 500 in which implementations of the disclosure may operate. The apparatus 500 may be the same or similar to one of the distributed computing system, a network, or other computing devices. The data store 510 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data store 510 may store information (e.g., network address information).

The apparatus 500 may include a processing device 520. The processing device 520 may execute a hypervisor 525. The hypervisor 525 may include a notification generating component 530, a notification providing component 532, a response receiving component 534 and virtual machines 536A-n operating under hypervisor 525.

The notification generating component 530 may generate notification messages that correspond to network addresses of a migrated VM. The notification providing component 532 may provide the notification message generated by the notification generating component 530. The notification providing component 532 may also identify networks for the identified network addresses of the migrated VM. The notification providing component 532 may further transmit the subsequent notification messages on the identified networks. The response receiving component 534 may receive response messages for the network addresses of a migrated VM. The response receiving component 534 may also determine that a response message has been received for each of the network addresses of the migrated VM.

Figure 6:
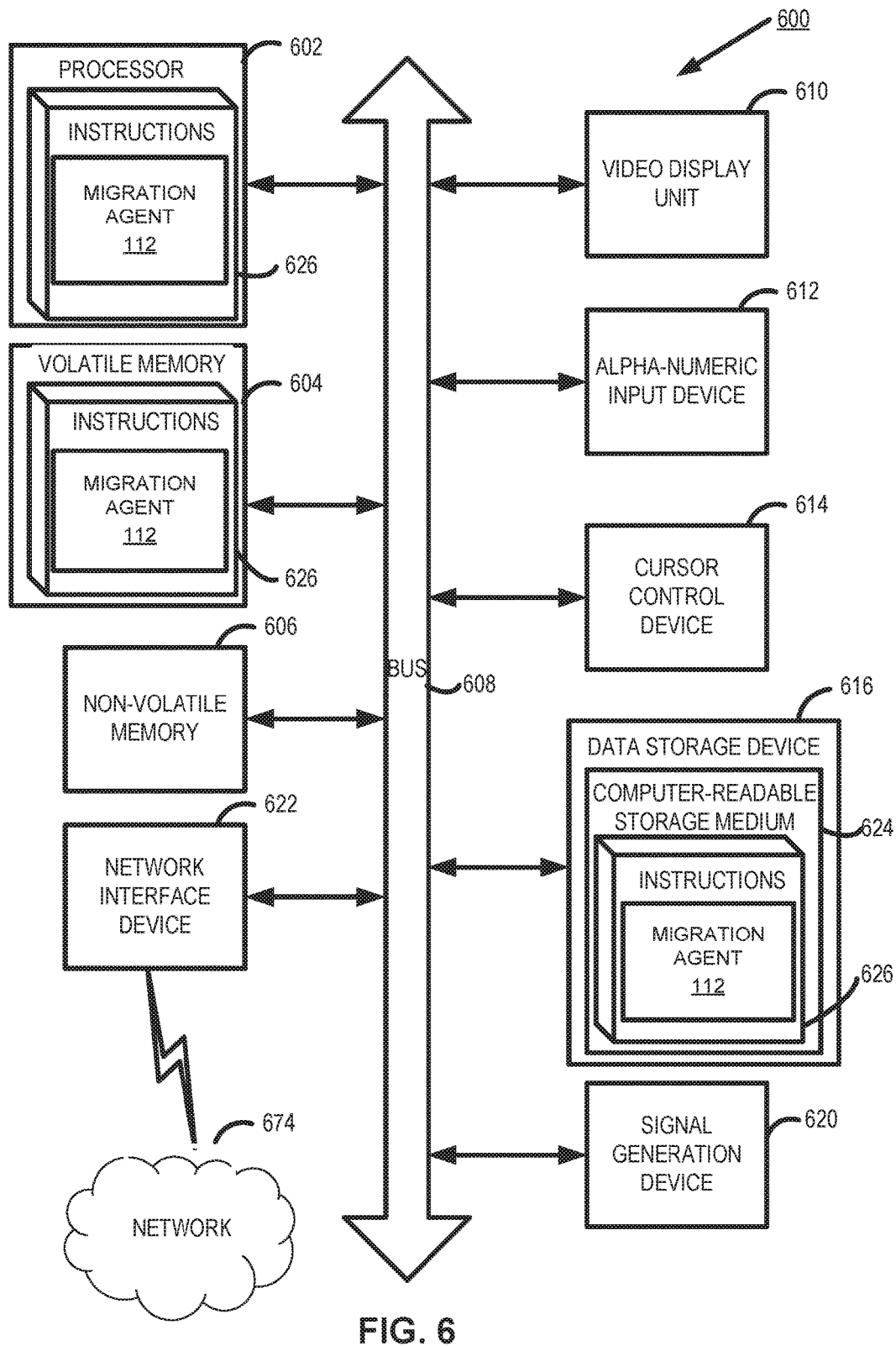
FIG. 6 depicts a block diagram of a computing system operating in accordance with one or more aspects of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. The computer system 600 may host the virtualization manager 110. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding migration agent 112 of FIG. 1 for implementing methods 200 or 300.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying, by a processing device executing a hypervisor, that a virtual machine has been migrated to the hypervisor from another hypervisor;
   in response to identifying that the virtual machine has been migrated, providing, by the hypervisor, a notification message comprising one or more network addresses associated with the migrated virtual machine;
   receiving, by the hypervisor, network traffic data;
   determining that the received network traffic data corresponds to a response message for at least one of the one or more network addresses associated with the migrated virtual machine;
   determining, by the hypervisor, that each of the one or more network addresses has not received the response message; and
   providing, by the hypervisor, a subsequent notification message at a time interval in view of determining that each of the one or more network addresses has not received the response message.

2. The method of claim 1, wherein providing the subsequent notification message comprises:
   determining that a first corresponding response message has been received for a first network address of the one or more network addresses;
   determining that a second corresponding response message has not been received for a second network address of the one or more network addresses;
   providing a first subsequent notification message at a second time interval in view of determining that the corresponding response message has been received for the first network address, wherein the second time interval is less than the time interval; and
   providing a second subsequent notification message at the time interval in view of determining that the second corresponding response message has not been received for the second network address.

3. The method of claim 1, wherein the time interval is determined in view of a number of network addresses of the one or more network addresses.

4. The method of claim 1, wherein determining whether the response message has been received for each of the one or more network addresses comprises:
   identifying, by the hypervisor, a first portion of the one or more network addresses where a corresponding response message has been received; and
   identifying, by the hypervisor, a second portion of the one or more network addresses where a corresponding response message has not been received, wherein the providing of the subsequent notification message corresponds to providing the subsequent notification message to the second portion of the one or more network addresses and not providing the subsequent notification to the first portion of the one or more network addresses.

5. The method of claim 1, wherein the response message identifies that a remote network component communicatively coupled to the virtual machine via at least one network of the networks for the one or more network addresses has received the notification message from the virtual machine at a network address of the one or more network addresses.

6. The method of claim 1, wherein the time interval comprises a variable time interval to provide subsequent notification messages at varying frequencies.

7. The method of claim 1, wherein the notification message identifies new physical addresses corresponding to the one or more network addresses of the migrated virtual machine.

8. A non-transitory computer readable storage medium having instructions that, when executed by a processing device, cause the processing device to:
   identify, by a hypervisor executed by the processing device, that a plurality of virtual machines have been migrated to the hypervisor from another hypervisor;
   in response to identifying that the plurality of virtual machines have been migrated, provide, by the hypervisor, notification messages associated with the plurality of migrated virtual machines, each of the plurality of migrated virtual machines having a corresponding notification message associated with a respective migrated virtual machine;
   receive, by the hypervisor, network traffic data;
   determine that the received network traffic data corresponds to response messages for the plurality of migrated virtual machines;
   determine, by the hypervisor, that a first set of the plurality of migrated virtual machines has received a respective response message and a second set of the plurality of migrated virtual machines has not received a respective response message;
   providing a first subsequent notification message associated with the first set of the plurality of migrated virtual machines at a first frequency; and
   providing a second subsequent notification message associated with the second set of the plurality of virtual machines at a second frequency that is higher than the first frequency.

9. The non-transitory computer readable storage medium of claim 8, wherein each of the notification messages comprises one or more network addresses associated with a respective migrated virtual machine.

10. The non-transitory computer readable storage medium of claim 9, wherein to provide the second subsequent notification message associated with the second set of the plurality of virtual machines at the high frequency, the processing device is further to:
    determine a number of the one or more network addresses associated with the second set of the plurality of virtual machines; and
    calculate the high frequency in view of the number of the one or more network addresses.

11. The non-transitory computer readable storage medium of claim 9, wherein at least one of the first frequency or the second frequency is a variable frequency.

12. The non-transitory computer readable storage medium of claim 8, wherein the response message identifies that a remote network component communicatively coupled to the virtual machine has received the notification message from the virtual machine.

13. A system comprising:
    a memory; and
    a processing device, operatively coupled with the memory, to:
       identify, by a hypervisor executed by the processing device, that a virtual machine has been migrated to the hypervisor from another hypervisor;
       in response to identifying that the virtual machine has been migrated, provide, by the hypervisor, a notification message comprising one or more network addresses associated with the migrated virtual machine;

receive, by the hypervisor, network traffic data;
determine that the received network traffic data corresponds to a response message for at least one of the one or more network addresses associated with the migrated virtual machine;
determine, by the hypervisor, that each of the one or more network addresses has not received the response message; and
provide, by the hypervisor, a subsequent notification message at a time interval in view of determining that each of the one or more network addresses has not received the response message.

14. The system of claim 13, wherein to provide the subsequent notification message, the processing device is further to:
determine that a first corresponding response message has been received for a first network address of the one or more network addresses;
determine that a second corresponding response message has not been received for a second network address of the one or more network addresses;
provide a first subsequent notification message at a second time interval in view of determining that the corresponding response message has been received for the first network address, wherein the second time interval is less than the time interval; and
provide a second subsequent notification message at the time interval in view of determining that the second corresponding response message has not been received for the second network address.

15. The system of claim 13, wherein to determine, by the virtual machine, that a response message has not been received for each of the one or more network addresses, the processing device is further to:
determine the response message has been received for the one or more network addresses; and
transmit a second subsequent notification message at a second time interval in view of determining that the response message has been received for the one or more network addresses.

16. The system of claim 13, wherein the time interval is determined in view of a number of network addresses of the one or more network addresses.

17. The system of claim 13, wherein to determine whether the response message has been received for each of the one or more network addresses, the processing device is further to:
identify, by the hypervisor, a first portion of the one or more network addresses where a corresponding response message has been received; and
identify, by the hypervisor, a second portion of the one or more network addresses where a corresponding response message has not been received, wherein the providing of the subsequent notification message corresponds to providing the subsequent notification message to the second portion of the one or more network addresses and not transmitting the subsequent notification to the first portion of the one or more network addresses.

18. The system of claim 13, wherein the response message identifies that a remote network component communicatively coupled to the virtual machine via at least one network of the networks for the one or more network addresses has received the notification message from the virtual machine at a network address of the one or more network addresses.

19. The system of claim 13, wherein the time interval comprises a variable time interval to provide subsequent notification messages at varying frequencies.

20. The system of claim 13, wherein the notification message identifies new physical addresses corresponding to the one or more network addresses of the migrated virtual machine.

* * * * *